June 14, 1932. J. MANGIONE ET AL 1,863,019
SUBMARINE DISTRESS SIGNAL
Filed March 8, 1932 2 Sheets-Sheet 1
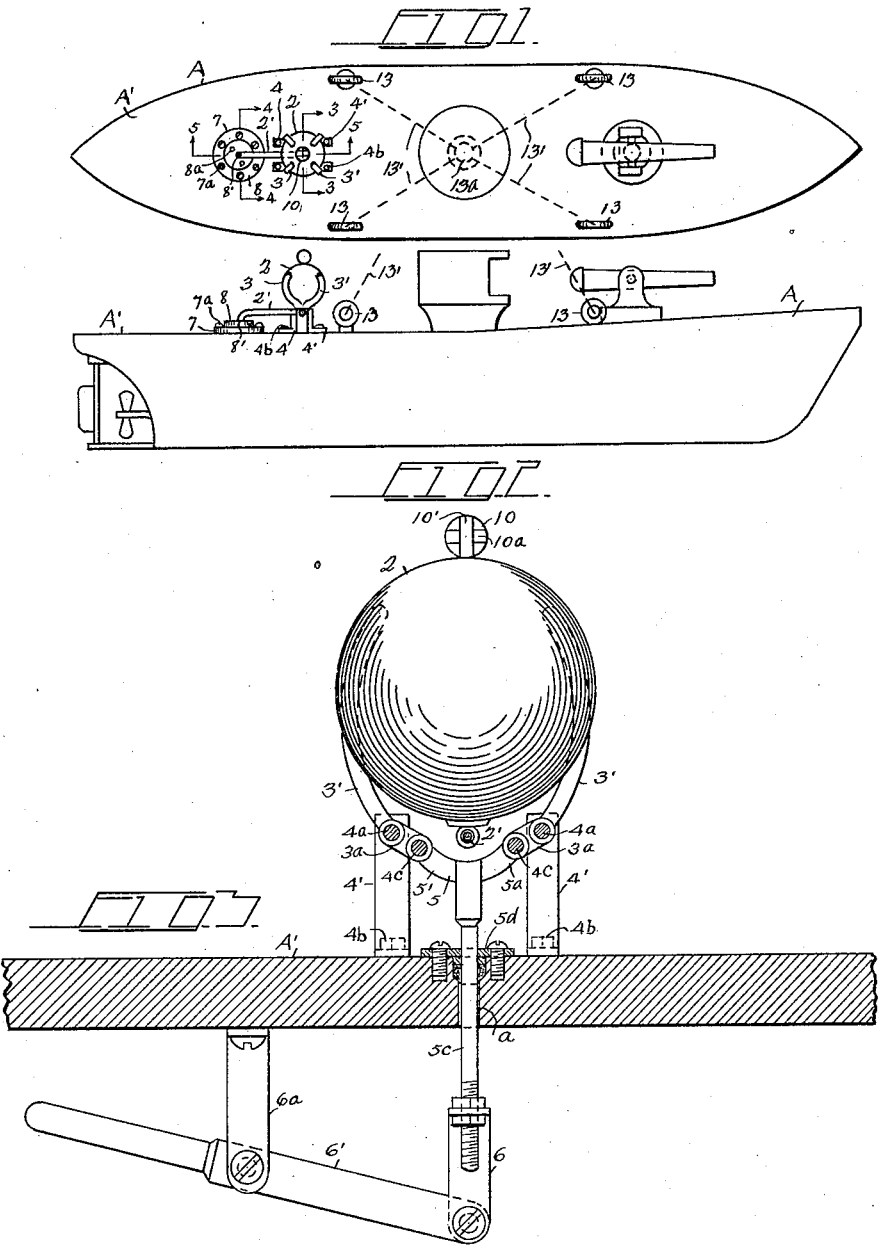
Inventor.
John Mangione.
Salvatore Terranova.
Harry D. Wallace.
Attorney.

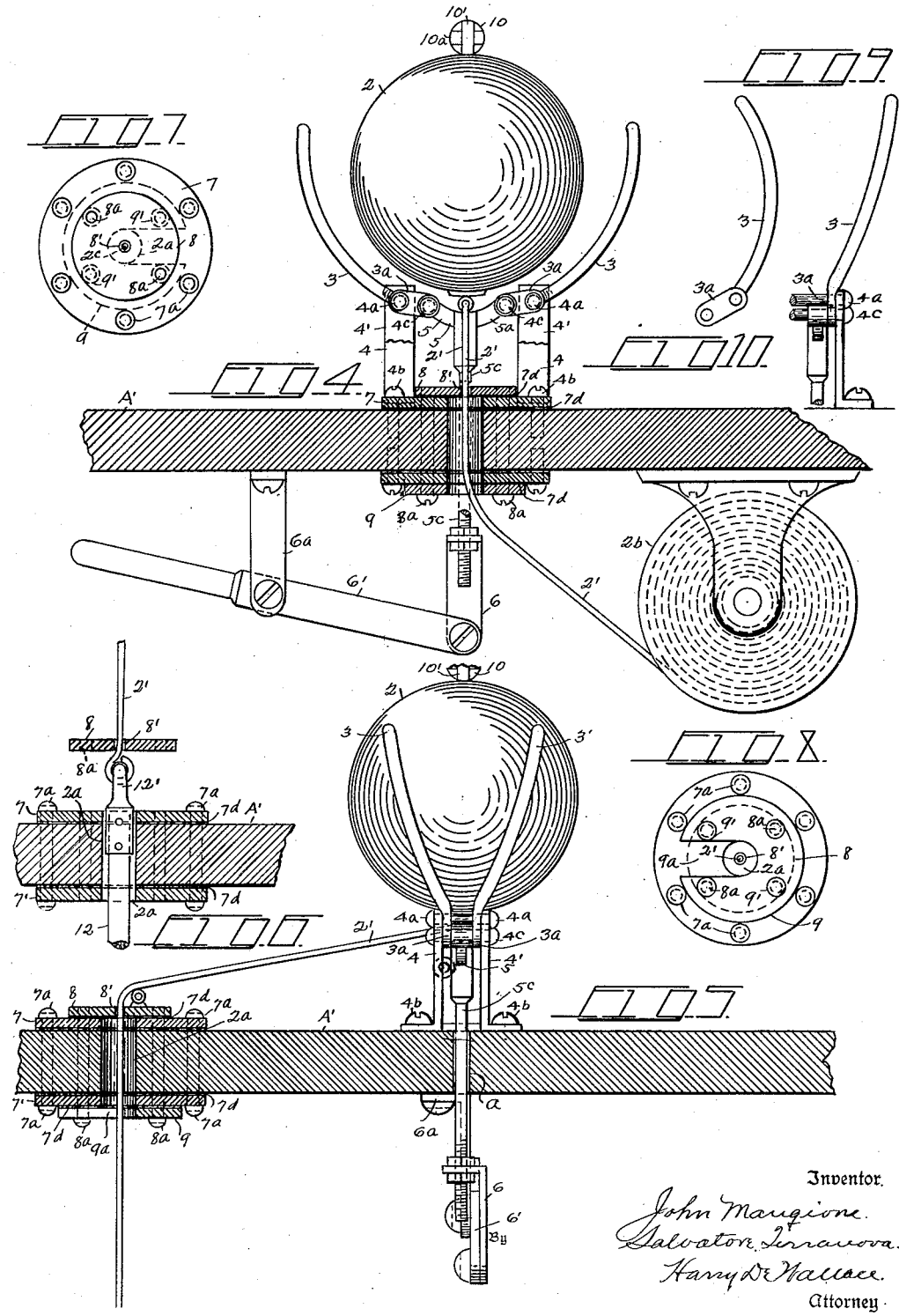

Patented June 14, 1932

1,863,019

UNITED STATES PATENT OFFICE

JOHN MANGIONE AND SALVATORE TERRANOVA, OF AUBURN, NEW YORK

SUBMARINE DISTRESS SIGNAL

Application filed March 8, 1932. Serial No. 597,444.

This invention relates to means for indicating location of a sunken vessel, and has for its object to provide novel and simple means for displaying a visual signal or marker upon the surface of the water to definitely indicate the said location. And a further object is to provide effective means for a rescue vessel to inspect and raise the sunken craft.

We attain these objects by the means set forth in the detailed description which follows, and as illustrated by the accompanying drawings, in which—

Figure 1 is a top plan view of a submarine or other vessel to which our improvement is applied. Fig. 2 is a side elevation of the vessel. Fig. 3 is an enlarged broken transverse vertical section taken on line 3—3 of Fig. 1, showing the inoperative state of the spherical buoy or float. Fig. 4 is a similar section taken on line 4—4 of Fig. 1, showing the buoy released and ready to rise to the surface of the water. Fig. 5 is a central vertical longitudinal section taken on line 5—5 of Fig. 1. Fig. 6 is a similar section also taken on line 5—5, showing means for utilizing the relatively light cable of the buoy to lift a heavier cable to the surface for various emergent uses. Fig. 7 is a top plan view of the means for controlling the paying out of the lighter and heavier cables. Fig. 8 is a bottom plan view of the same. And Figs. 9 and 10 are respectively front and side elevations of one of the claws or arms that control the capture and release of the spherical signal member.

In the drawings, A represents a submersible or other vessel, and A' represents the deck of the same. 2 represents a buoyant signal member preferably a hollow sphere, to which is attached one end of a relatively light cable 2', that extends through an opening 2a in the deck and is then wound around a drum or reel 2b, which is preferably disposed below decks and may be suspended from the under side of the deck, as shown in Fig. 4. The floatable member 2 is preferably mounted upon the deck A', and when inoperative or idle, is held captive in the grip of a plurality of arms or claws, as 3—3', which are bent to conform to the curvature of the sphere, as shown in Figs. 3, 4 and 5. The lower ends of the claws 3 are pivoted to L-shaped brackets 4—4' by common bolts 4a, and the feet of said brackets may be secured to the deck by fasteners 4b. The lower ends of the claws are shown flattened, as at 3a, and perforated to receive the bolts 4a, and also bolts 4c, by which said ends are pivoted to the corresponding arms 5'—5a of a yoke 5, which may be integral with an operating rod 5c, which passes downwardly through an opening a in the deck, as shown in Figs. 3 and 4, the lower end of said rod being threaded and adjustably connected with an angular link 6, to which a hand lever 6' is pivoted. The lever 6' is supported medially by a fulcrum member 6a, which may depend from the under side of the deck, as shown in Figs. 3, 4 and 5. The rod 5c preferably passes through a stuffing box 5d (see Fig. 3), to prevent leakage at said point at times when the vessel is submerged. Figs. 1, 2, 3 and 5 show the buoy gripped and held by the jaws 3—3', while Fig. 4 shows the jaws expanded for releasing the buoy. The respective openings a—2a in the deck for the float-controlling rod 5c and cable 2' are preferably spaced some distance apart, as shown in Fig. 5, for the purpose of obviating danger of the cable 2' becoming entangled with the operating rod and related parts. When the float is released, it rises by its own buoyancy and in doing so, swings towards the left, according to Fig. 5, until cable 2 aligns with the opening 2a, as shown in Fig. 6. The mechanism that controls the passage of the cable 2' through the opening 2a comprises the following parts: The opening 2a in the deck is preferably relatively large as compared with the diameter of the cable 2' (see Figs. 4, 5 and 6), partially to give more freedom to said cable, and this enlarged opening is guarded by correspondingly perforated top and bottom plates 7—7', which may be rigidly secured to the opposite faces of the deck by fasteners 7a. These plates are preferably separated from the deck by suitable packings, as 7d. The cable 2' preferably passes through and is supported and guided by a smaller detachable plate 8 having an opening 8′ preferably only slightly larger than the cable, the said plate being clamped to the plate 7 by bolts 8a that pass through plates 7—7′ and the intervening deck, and also pass through a horseshoe-shaped bottom plate 9, which is independently secured by bolts 9′, as best seen in Figs. 4, 5 and 8. The slot 9a in plate 9 facilitates its ready attachment and detachment, in case of necessity, without disturbing the cable 2′.

The signal member 2 is preferably fitted with a smaller spherical target or marker, as 10, which is disposed diametrically opposite the coupling of the cable 2′, and this target is preferably decorated with a clear white band, as 10′, and also with a red or other colored band, as 10a, for the purpose of attracting the attention of sailors of other craft by varicolored flashes produced by the bobbing of the member 2. These colored stripes are deemed preferable to flags or pennants, which are unreliable, especially when the fabric is wet and liable to become entangled with the flagstaffs or poles.

In practice, when the vessel A submerges and becomes disabled to such extent that it cannot rise to the surface of the water by its own power, an attendant pulls downwardly on the free end or handle of lever 6′. This raises rod 5c and rocks and spreads the jaws 3—3′, as shown in Fig. 4 and instantly releases and enables the spherical member 2, by the paying out of cable 2′, to rise to the surface to display the distress signal and call for help or rescue. In case another vessel picks up this distress signal, the rescuers may employ any suitable code for communicating with the submerged crew, in order to ascertain their true plight, and thereafter may employ any rescuing tactics that may be prescribed in such cases. In case it is determined to attempt to raise the sunken craft, divers may be sent down to investigate the conditions and in doing so, they may be positively guided by the cable 2′ and promptly land upon the deck of the submerged vessel. In view of the extreme lightness of the cable 2′, it may be preferred to substitute for said cable a heavier one before attempting the initial inspection. There being no means for the imprisoned crew to emerge and render physical assistance and it being impractical to lower a heavier cable and have it attached to the grounded vessel by its own crew, provision is herein made for the submerged crew, after a suitable exchange of signals and instructions, to supply a heavier emergency cable, as 12, and in order to do so, the cable 2′ may be cut from the reel and its free end secured to the end of the emergency cable, as shown in Fig. 6, the said end being preferably fitted with a loop 12′ for the purpose. As the opening 8′ in the plate 8 is too small to allow the cable 12 to pass through the deck, the said plate must be released from the plate 7. This may be readily and quickly accomplished by the attendant removing bolts 8a, after which the cable 12 may be drawn upwardly towards the surface of the water by the rescuers simply detaching the buoy and reeling in the cable 2′. This upward movement of the cable 12 carries the plate 8 with it, as shown in Fig. 6. As the cable 12 naturally loosely fits the opening 2a, any suitable means (not shown) may be employed for packing said parts and thereby stanching the gravitation or inflow of the sea water through the opening 2a. The cable 12 may then be drawn towards the surface as explained, and when said cable comes to hand, it may be made fast to the rescue vessel. By the provision of the cable 12, hoisting gear may be lowered and guided by the said cable, and when the divers descend, they will find said gear on the deck of the sunken vessel ready to be secured preparatory to raising the said vessel. In order to better understand the last described work, Figs. 1 and 2 show conventionally four heavy loops, as 13, secured to the deck A′, to which branches comprising heavy chains 13′ which radiate from a still heavier hoisting cable 13a, may be connected in any well-known manner. After these branch chains are secured to the eyes 13, hoisting apparatus carried by the rescuing vessel may wind up cable 13a and lift the sunken ship to the surface. The hoisting apparatus not being a part of our invention, none of the details of construction of such apparatus will be herein shown.

Having thus described our invention, what we claim, is—

1. A buoyant signal for indicating location and distress of a submerged vessel, comprising a buoyant sphere mounted upon the deck of the vessel, a plurality of arms adapted to grip and hold the sphere inoperative, means passing through a small opening of the deck and operable from the interior of the vessel to cause said arms to grip and release the sphere, a cable attached to the sphere and passing through a second larger opening of the deck and being wound upon a drum disposed below the deck, a guide plate mounted on top of the deck having an opening to operatively receive said cable, a heavier emergency cable stowed in the hold of the vessel, and means within the vessel to release said guide plate to enable the emergency cable to be drawn through the larger opening by the smaller cable to supplant the latter cable.

2. A vessel having in combination with its main deck formed with a small and a large opening, a buoyant sphere disposed above said deck adapted to indicate location of the vessel when the latter is submerged and helpless, a plurality of arms to grip and hold said sphere captive, a rod passing through said small opening and pivotally connected to all of said arms, means located within the vessel to reciprocate said rod for moving said arms towards and away from the sphere, a guide plate mounted upon the top of the deck and overlying said large opening, said plate having a small opening that registers with the large opening, a cable attached to the sphere and passing downwardly through the opening in said plate and being wound upon a drum supported below the deck, an emergency cable to supplant the first cable having a diameter corresponding to that of the larger opening adapted to be connected to the smaller cable and to be drawn upwardly towards the surface of the water by the latter cable, and means to release said guide plate to enable the emergency cable to be drawn through the deck.

3. A submarine distress signal comprising a buoyant body mounted upon the deck of the vessel, a plurality of gripping arms to hold said body inoperative, brackets rising from the deck to pivotally support said arms, a rod reciprocable in an opening in the deck, the upper end of said rod comprising a yoke pivotally connected to said arms, a lever below the deck adapted to reciprocate said rod for opening and closing said arms, a cable normally wound upon a drum mounted below the deck, the free end of said cable passing upwardly through a second enlarged opening in the deck and attached to the buoyant body, a guide plate mounted upon the top face of the deck having an opening to operatively receive said cable, an emergency cable having a diameter to operatively fit the enlarged opening of the deck and having one end formed with a loop adapted to be coupled to the small cable, and means to clamp said guide plate to the deck, said means being operable from the interior of the vessel to release said plate to enable said smaller cable to draw the larger cable towards the surface of the water.

In testimony whereof we affix our signatures.

JOHN MANGIONE.
SALVATORE TERRANOVA.